(12) United States Patent  (10) Patent No.: US 9,103,147 B1
Chuang  (45) Date of Patent: Aug. 11, 2015

(54) SYNCHRONIZED MULTIPLE-ANGLE ROTATABLE DUAL-PIVOT STRUCTURE

(71) Applicant: Deda Metals Company Limited, New Taipei (TW)

(72) Inventor: Kun-You Chuang, New Taipei (TW)

(73) Assignee: DEDA METALS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/247,241

(22) Filed: Apr. 7, 2014

(51) Int. Cl.
*E05D 7/00* (2006.01)
*E05D 5/12* (2006.01)
*E05D 3/06* (2006.01)
*E05D 7/06* (2006.01)

(52) U.S. Cl.
CPC *E05D 5/121* (2013.01); *E05D 3/06* (2013.01); *E05D 7/06* (2013.01)

(58) Field of Classification Search
CPC ............... E05D 3/12; E05D 3/06; E05D 3/10; G06F 1/1681; G06F 1/1616; G06F 1/1618; E05Y 2900/606; H04M 1/0216; H04M 1/0222; H04M 1/022; H05K 5/0226
USPC ........... 16/366, 368, 369, 340, 337, 334, 389, 16/357, 360, 361, 342, 330, 303; 361/679.6, 679.9, 679.17, 679.27; 248/917–923, 284.1; 379/433.12, 379/433.13; 455/575.1, 575.3, 575.4, 455/550.1, 90.3; 348/333.06, 373, 794
See application file for complete search history.

(56) References Cited

U.S. PATENT DOCUMENTS

| 2009/0000062 | A1* | 1/2009 | Yamanami | 16/366 |
| 2010/0149764 | A1* | 6/2010 | Ueyama | 361/749 |
| 2011/0255221 | A1* | 10/2011 | Ling | 361/679.01 |
| 2011/0265288 | A1* | 11/2011 | Chiang | 16/341 |
| 2011/0289726 | A1* | 12/2011 | Zhang et al. | 16/250 |
| 2012/0047685 | A1* | 3/2012 | Ma et al. | 16/319 |
| 2012/0192381 | A1* | 8/2012 | Zhang et al. | 16/366 |
| 2013/0318746 | A1* | 12/2013 | Kuramochi | 16/342 |
| 2014/0268533 | A1* | 9/2014 | Meyers et al. | 361/679.27 |
| 2014/0338483 | A1* | 11/2014 | Hsu et al. | 74/96 |
| 2014/0352113 | A1* | 12/2014 | Chen et al. | 16/366 |
| 2015/0013107 | A1* | 1/2015 | Shin et al. | 16/366 |
| 2015/0040353 | A1* | 2/2015 | Chen et al. | 16/366 |

* cited by examiner

*Primary Examiner* — Chuck Mah
(74) *Attorney, Agent, or Firm* — Leong C. Lei (57) ABSTRACT

A synchronized multiple-angle rotatable dual-pivot structure includes a first pivot, a second pivot, a plurality of connection members, and a support frame. The first pivot and the second pivot are each provided with an installation slot. The connection members are of the same length and each has two ends respectively and movably mounted in the installation slots of the first pivot and the second pivot. The support frame has two ends respectively coupled to the first pivot and the second pivot. The connection members are connected between the first pivot and the second pivot so that when one of the first pivot and the second pivot is rotated, forces are induced between the first pivot and the second pivot to mutually pull and push each other so that synchronized rotation can be achieved in an easy and effortless manner and the rotation angle can reach at least 180 degrees.

9 Claims, 11 Drawing Sheets

SYNCHRONIZED MULTIPLE-ANGLE ROTATABLE DUAL-PIVOT STRUCTURE

TECHNICAL FIELD OF THE INVENTION

The present invention generally relates to a pivot structure, and more particularly to a synchronized multiple-angle rotatable dual-pivot structure.

DESCRIPTION OF THE PRIOR ART

The progress of science and technology brings wide applications of liquid crystal displays as display devices for electronic devices.

Taking a notebook computer as an example, the computer comprises a liquid crystal display that is mounted to a cover of the computer. To use the computer, the cover is lifted open in order to expose the liquid crystal display mounted thereon. The cover and the host computer are connected to each other with a pivot to allow the cover to open/close with respect to the host computer.

Thus, the pivot is an important factor that affects the quality of electronic devices or computer devices. To allow the casing carrying the screen and the casing carrying a keyboard to be rotated to any angle desired by a user, a dual-pivot hinge is available in the market. The conventional dual-pivot hinge is structured such that the two single-pivot hinges are rotatable in an independent manner so that when a user opens an electronic device by lifting up the screen carrying casing, due to a non-uniform application of force or a difference of torques induced by the hinges, the two single-pivot hinges may reach different rotational angles thereby affecting the smoothness of opening the screen-carrying casing. Further, since the two single-pivot hinges may have different frequencies and extents of operation, one of the hinges of the dual-pivot hinge may be over-used so as to shorten the lifespan thereof.

A conventional simultaneously-driving dual-pivot hinge, such as that disclosed in Taiwan Utility Model M465760, comprises a dual pivot structure of which simultaneous driving is achieved with a planetary assembly that is driven by means of a single link member so that the operation consumes an extended period of time and requires a user to spend a great effort and may not be effective to achieve synchronized rotation.

Other currently available simultaneously-driving dual-pivot hinges include a gear based simultaneously-driving dual-pivot hinge and a rail-based simultaneously-driving dual-pivot hinge, of which the gear based simultaneously-driving dual-pivot hinge comprises toothed structures fit to two rotation pivots and a gear train arranged between the two rotation pivots and mating the toothed structure to overcome the problems associated with the conventional dual-pivot hinge. However, the arrangement of a plurality of gears of the gear train is complicated and accurate mating must be achieved with precise design to allow the two rotation pivots to operate simultaneously with each other. This makes the manufacture and assembly difficult. Further, the gears are susceptible to damages. The rail-based simultaneously-driving dual-pivot hinge may readily suffer to simultaneous derailing and has imperfect structure and functionality.

SUMMARY OF THE INVENTION

An object of the present invention is to provide a synchronized multiple-angle rotatable dual-pivot structure, which allows two pivots to generate a force for pushing or pulling each other to achieve synchronized rotation operations thereof.

To achieve the above object, the present invention comprises a first pivot, a second pivot, at least two connection members, and a support frame, wherein the first pivot comprises a first mounting section and the first mounting section is mountable to one component of an article to be assembled and the first pivot comprises at least two first installation slots; the second pivot comprises a second fixing section and the second fixing section is mountable to another component of the article to be assembled and the second pivot comprises at least two second installation slots; the connection members are of the same length and each of the connection members has two ends respectively and movably mounted in the first installation slots and the second installation slots; and the support frame has two ends respectively coupled to the first pivot and the second pivot. The connection members are connected between the first pivot and the second pivot so that when one of the first pivot and the second pivot is rotated, forces are induced between the first pivot and the second pivot to mutually pull and push each other so that synchronized rotation can be achieved in an easy and effortless manner and the rotation angle can reach at least 180 degrees.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 3, and 4, the present invention comprises a first pivot 10, a second pivot 20, a plurality of connection members 30, and a support frame 40, which will be described in detail as follows:

The first pivot 10 comprises a first mounting section 11. The first mounting section 11 is mountable to one component of an article to be assembled, such as a top cover of a notebook computer. The first pivot 10 comprises at least one first installation slot 12 and two first installation slots 12 are shown in the instant embodiment. The first installation slots 12 are provided for coupling with the connection members 30.

The second pivot 20 comprises a second fixing section 21. The second fixing section 21 is mountable to another component of the article to be assembled, such as a base of the notebook computer. The second pivot 20 comprises at least one second installation slot 22 and two second installation slots 22 are shown in the instant embodiment. The second installation slots 22 are provided for coupling with the connection members 30.

The plurality of connection members 30 is two in quantity in the instant embodiment. The plurality of connection members 30 has the same length. The connection members 30 each have two ends movably and respectively mounted in the first installation slots 12 and the second installation slots 22. The connection members 30 each function to provide a pushing or pulling force between the first pivot 10 and the second pivot 20.

The support frame 40 has two end portions respectively receiving the first pivot 10 and the second pivot 20 to extend therethrough. The support frame 40 functions to support and connect the first pivot 10 and the second pivot 20.

The first mounting section 11 comprises two fixing holes 111 formed therein whereby fixing elements 11 are received through the fixing holes 111 to achieve fixed mounting to said one component of the article to be assembled.

The second fixing section 21 comprises two fixing holes 211 formed therein whereby fixing elements 21 are received through the fixing holes 211 to achieve fixed mounting to said another component of the article to be assembled.

The present invention further comprises a plurality of axles 50 and four axles 50 are shown in the instant embodiment. The first installation slot 12 and the second installation slot 22 each comprise a plurality of axle holes 121, 221 and in the instant embodiment, the axle holes 121, 221 are arranged in two sides of the first installation slot 12 or the second installation slot 22 to be opposite to each other. The axles 50 are set through opposite ends of each of the connection members 30 and are set in coupling engagement with the axle holes 121, 221 so as to have the two ends of each of the connection members 30 movably and respectively coupled in the first installation slot 12 and the second installation slot 22.

The first pivot 10 comprises an elastic plate 60 and a washer 70 fit thereto. The first pivot 10 comprises a threaded section 13 and a nut 80 is set in threading engagement with the threaded section 13, so that the nut 80 may securely fix the support frame 40, the elastic plate 60, and the washer 70 in position.

The second pivot 20 comprises an elastic plate 60 and a washer 70 fit thereto. The second pivot comprises a threaded section 23 and a nut 80 is set in threading engagement with the threaded section 23, so that the nut 80 may securely fix the support frame 40, the elastic plate 60, and the washer 70.

The above is a description of each of the components that make up of the present invention and the operations thereof will be described as follows:

Referring to FIGS. 5, 6, 7, 8, and 9, the present invention uses the connection members 30 to connect between the first pivot 10 and the second pivot 20 so that when one of the first pivot 10 and the second pivot 20 is rotated, a pushing or pulling force is induced between the first pivot 10 and the second pivot 20. For example, when a force is applied to the first pivot 10 to cause rotation thereof, the first pivot 10 may pull, via one of the connection members 30, the second pivot 20 to move and may also push, via the other one of the connection members 30, the second pivot 20 to move. Similarly, the second pivot 20 that is driven by the first pivot 10 to rotate may also apply a force, via the two connection members 30, to pull or push the first pivot 10 to move. As such, the first pivot 10 and the second pivot 20 can mutually drive each other, making it easy and effortless for them to achieve synchronized rotation.

With the above described structure and function, the present invention is applicable to a foldable electronic device that requires a pivot, such as a notebook computer, a portable television, a mobile phone and a display device, or mounted to a door that is arranged at one side of a wall.

Figure 1:
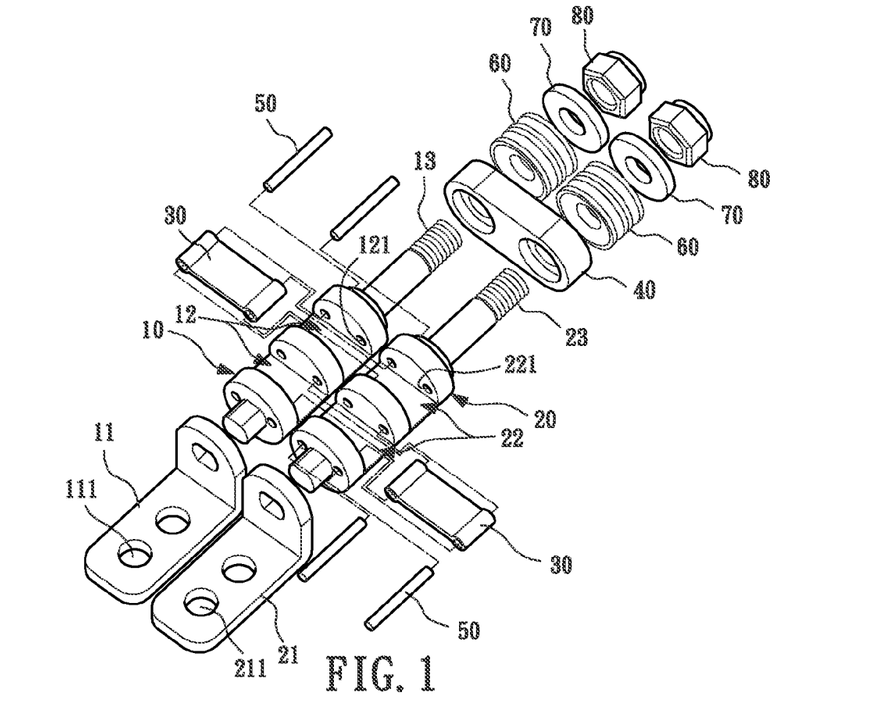
FIG. 1 is an exploded view of the present invention.
Figure 2:
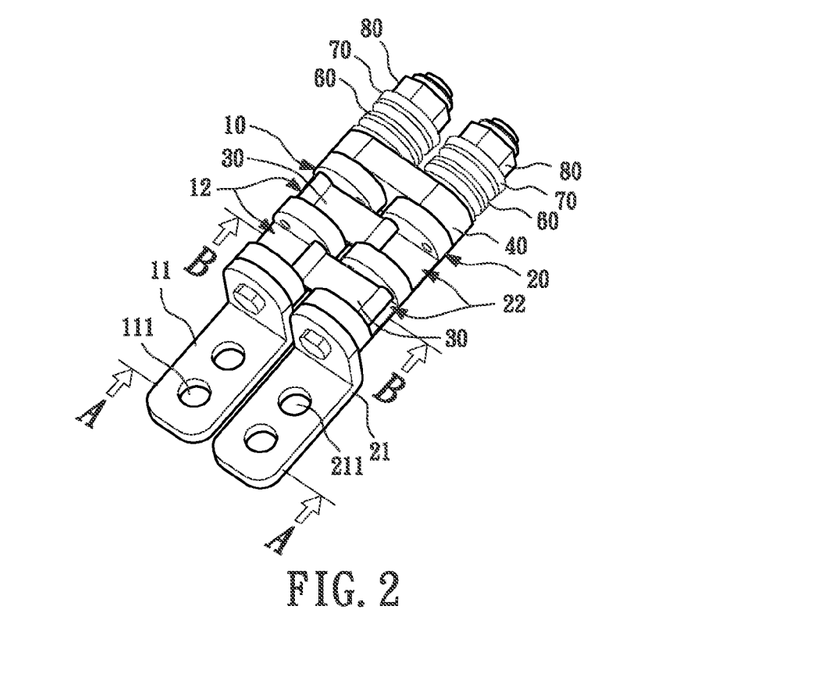
FIG. 2 is a perspective view of the present invention.
Figure 3:
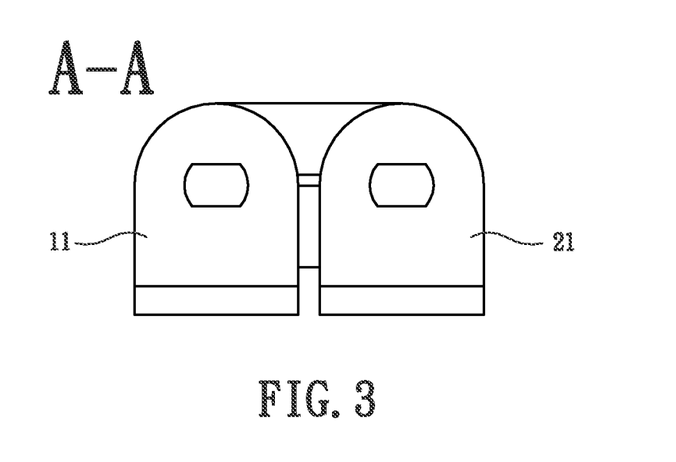
FIG. 3 is a cross-sectional view taken along line A-A of FIG. 2.
Figure 4:
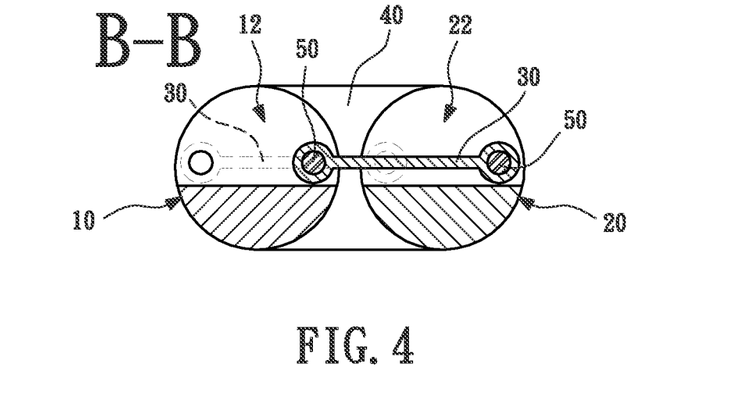
FIG. 4 is a cross-sectional view taken along line B-B of FIG. 2.
Figure 5:
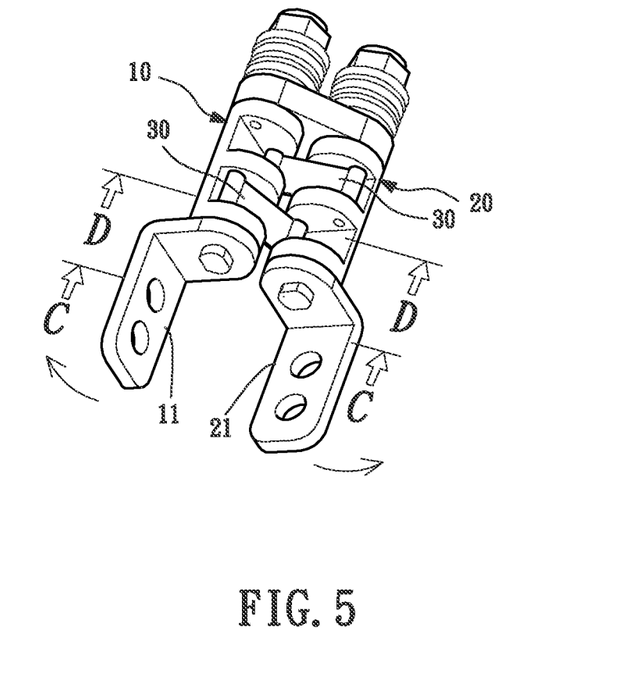
FIG. 5 is a perspective view demonstrating an example of operation of the present invention.
Figure 6:
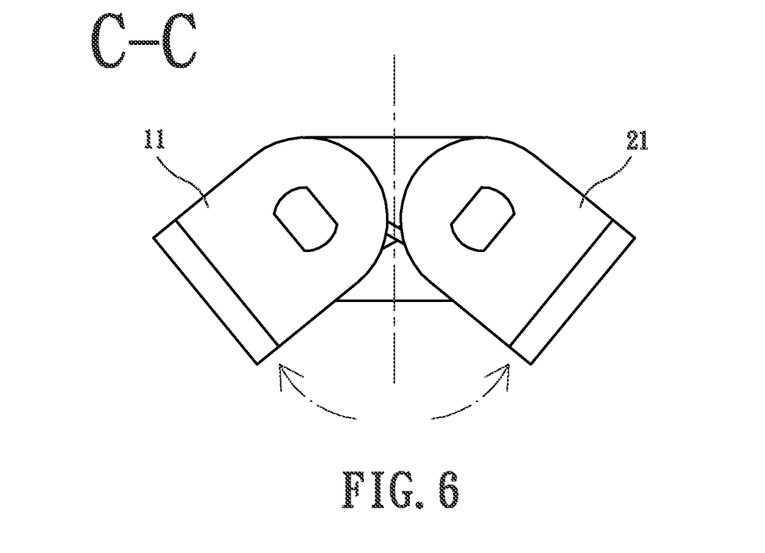
FIG. 6 is a cross-sectional view taken along line C-C of FIG. 5.
Figure 7:
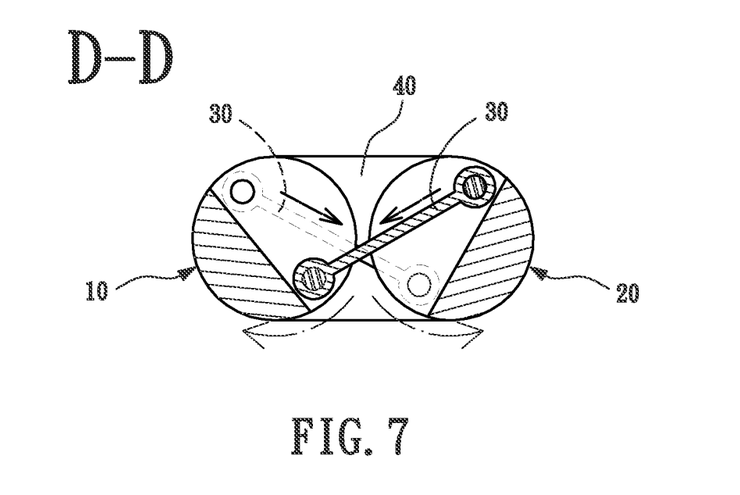
FIG. 7 is a cross-sectional view taken along line D-D of FIG. 5.
Figure 8:
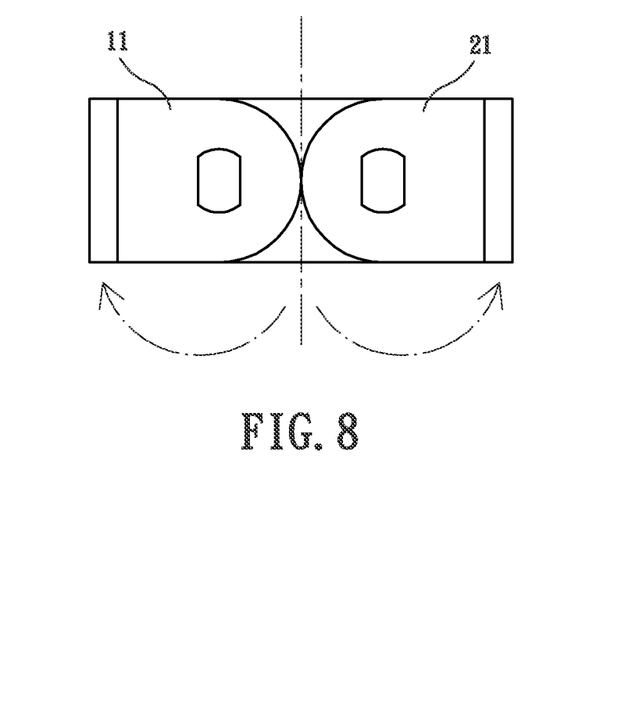
FIG. 8 is a side elevational view demonstrating another example of operation of the present invention.
Figure 9:
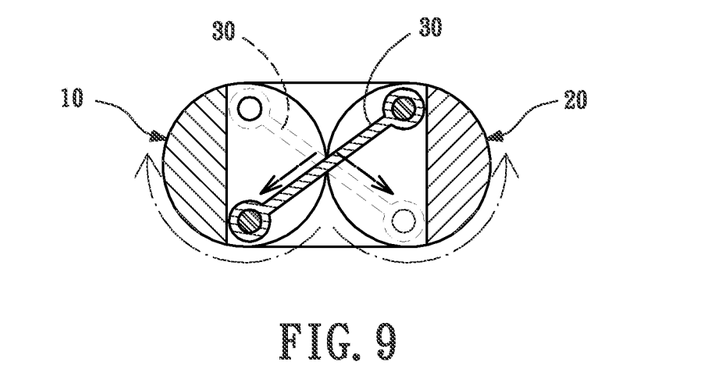
FIG. 9 is a cross-sectional view of FIG. 8.
Figure 10:
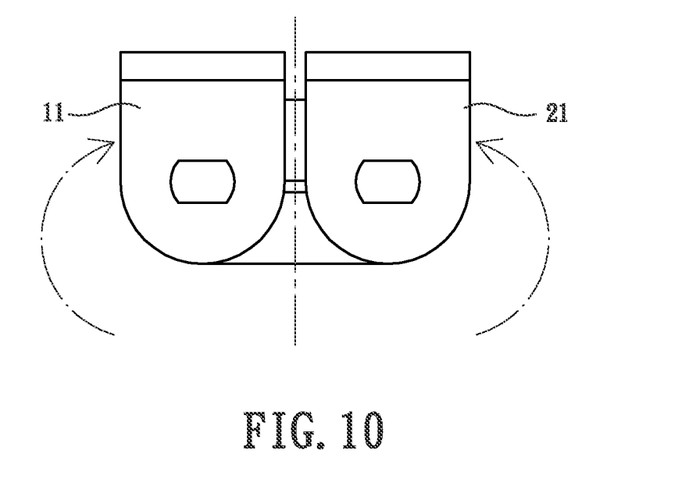
FIG. 10 is a side elevational view demonstrating a further example of operation of the present invention.
Figure 11:
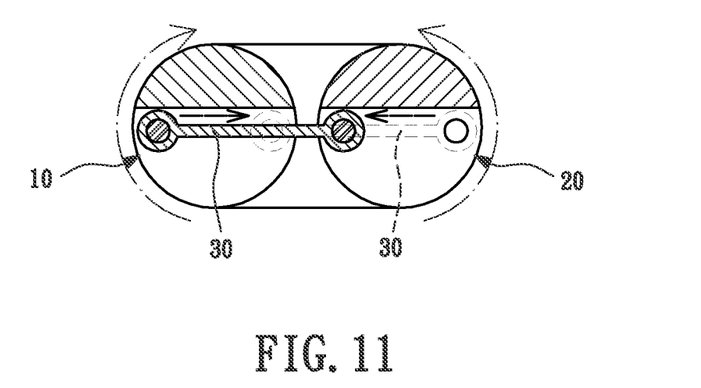
FIG. 11 is a cross-sectional view of FIG. 10.

Referring to FIGS. 10 and 11, the present invention enables expansion of rotation angle of the first pivot 10 and the second pivot 20 to reach at least 180 degrees.

Figure 12:
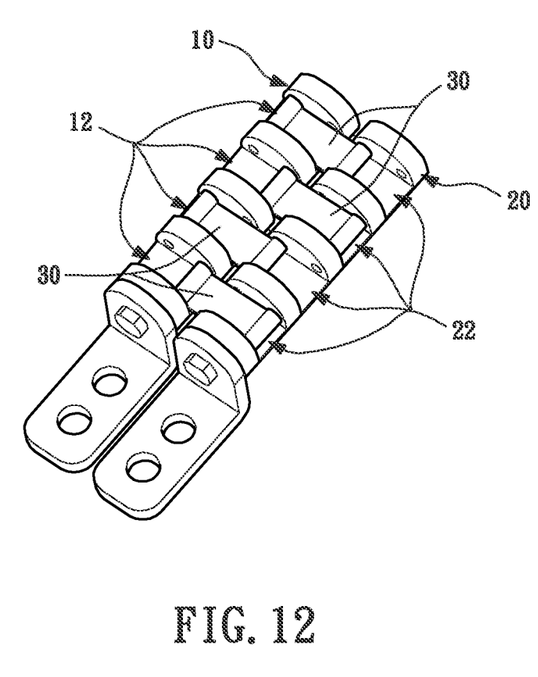
FIG. 12 is a perspective view showing another embodiment of the present invention.

Referring to FIG. 12, in an embodiment, the first pivot 10 is provided with four or more than four first installation slots 12 and the second pivot 20 is provided with four or more than four second installation slots 22 and the connection members 30 are provided in a quantity of four or more than four. As such, the mutual pushing or pulling force between the first pivot 10 and the second pivot 20 can be enhanced.

Figure 13:
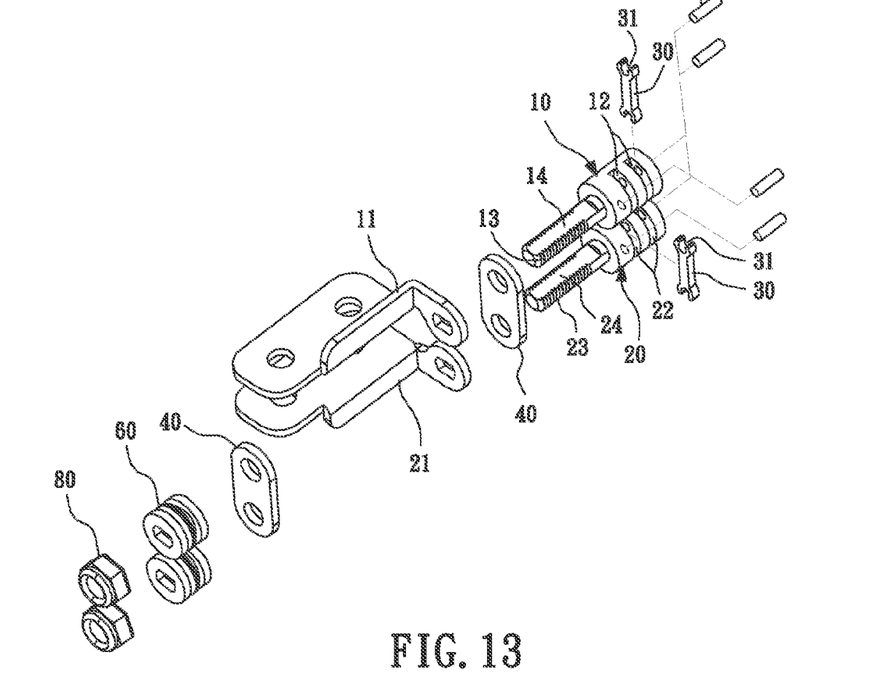
FIG. 13 is an exploded view of said another embodiment of the present invention.
Figure 14:
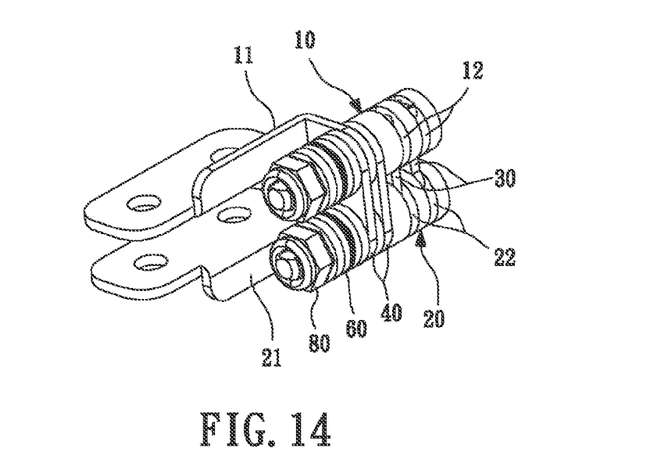
FIG. 14 is a perspective view showing a further embodiment of the present invention.
Figure 15:
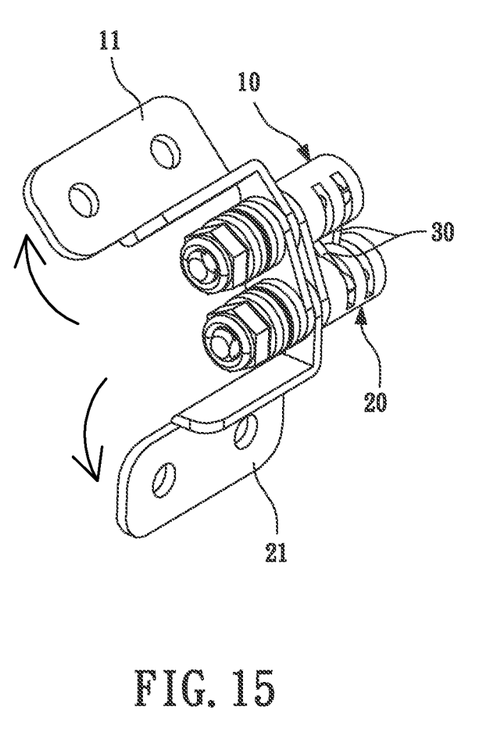
FIG. 15 is a perspective view demonstrating an operation of said another embodiment of the present invention.

Referring to FIGS. 13, 14, and 15, in an embodiment, the first mounting section 11, the second fixing section 21 and the support frame 40, the elastic plates 60, the nuts 80 can be arranged at the same side of the first pivot 10 and the second pivot 20. The first pivot 10 and the second pivot 20 are each provided with a planar face 14, 24, whereby the support frame 40, the elastic plates 60, and the nuts 80, when fit thereto, are not allowed to freely rotate with respect thereto so as to enhance the effect of fixing. The present invention comprises a plurality of axles 50. The axles 50 are mounted in the first installation slot 12 and the second installation slot 22. Two ends of each of the connection members 30 are respectively provided with two fitting openings 31, the fitting openings 31 being each in the form of a notch to allow the fitting opening 31 to fit over a corresponding one of the axles 50, whereby the two ends of each of the connection members 30 are movably land respectively mounted in the first installation slots 12 and the second installation slots 22 for similarly making the first pivot 10 and the second pivot 20 to simultaneously and mutually apply pulling and pushing forces to each other.

Figure 16:
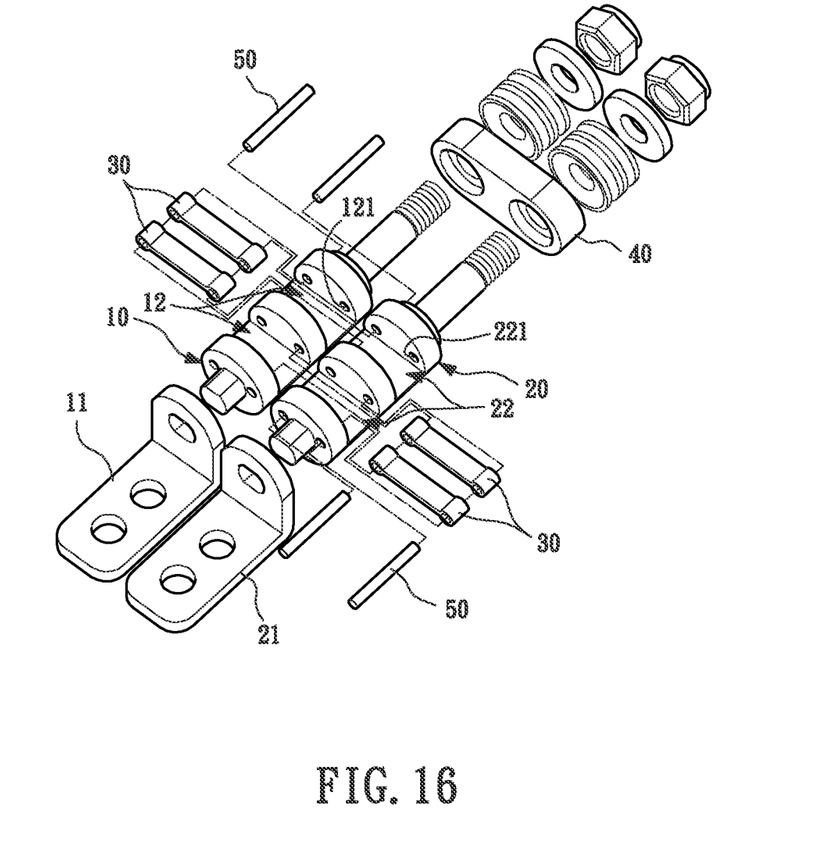
FIG. 16 is an exploded view showing a further embodiment of the present invention.

Referring to FIG. 16, in an embodiment, the connection members 30 are received in multiplicity in each of the first installation slots 12 and the second installation slots 22 and in the instant embodiment, two are received in each of the first installation slots 12 and the corresponding second installation slots 22 for easy manufacturing.

Figure 17:
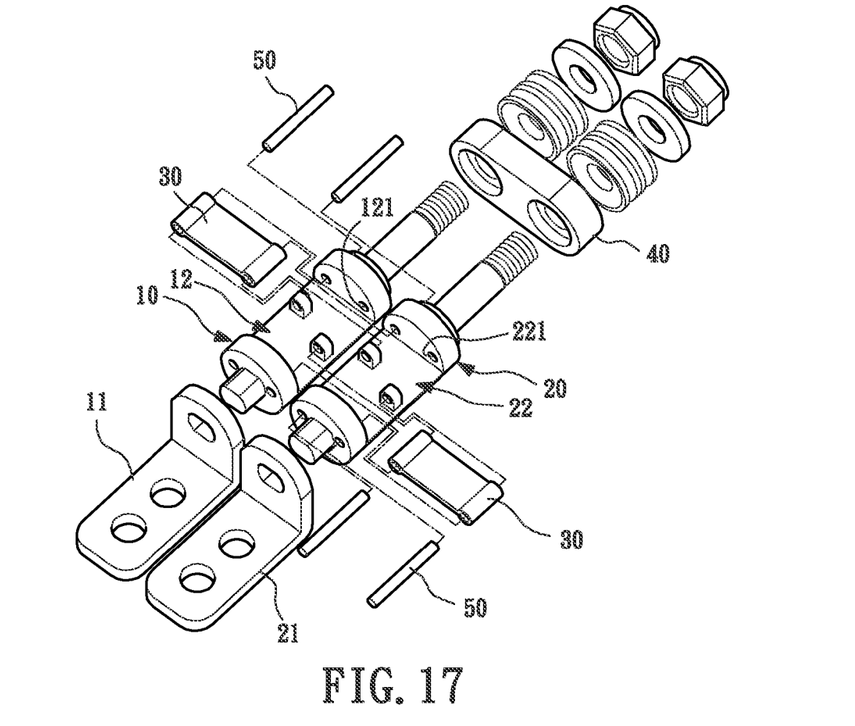
FIG. 17 is an exploded view showing a further embodiment of the present invention.
Figure 18:
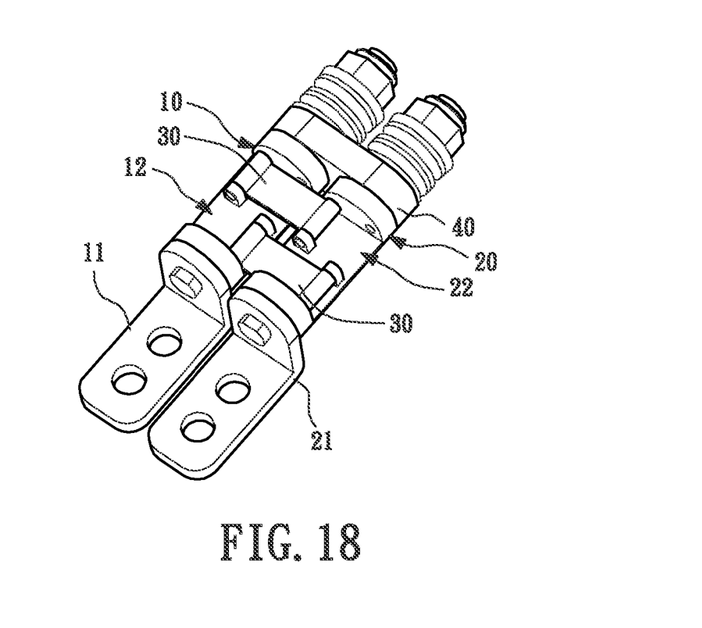
FIG. 18 is a perspective view showing yet a further embodiment of the present invention.

Referring to FIGS. 17 and 18, in an embodiment, the first pivot 10 is provided with a single first installation slot 12 and the second pivot 20 is provided with a single second installation slot 22. Two connection members 30 are provided, each having two ends respectively and movably mounted in the first installation slot 12 and the second installation slot 22 for easy manufacturing.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A synchronized multiple-angle rotatable dual-pivot structure, comprising:
    a first pivot, which comprises a first mounting section, the first mounting section being adapted to be mounted to one component of an article to be assembled, the first pivot comprising at least one first installation slot;
    a second pivot, which comprises a second mounting section, the second mounting section being adapted to be mounted to another component of the article to be assembled, the second pivot comprising at least one second installation slot;
    at least two connection members, which are of the same length, the connection members each having two ends rotatably and respectively mounted in one of said at least one first installation slot and one of said at least one second installation slot; and
    a support frame, which has two end portion rotatably and respectively coupled to the first pivot and the second pivot.

2. The synchronized multiple-angle rotatable dual-pivot structure according to claim 1, wherein the first mounting section comprises at least one fixing hole formed therein.

3. The synchronized multiple-angle rotatable dual-pivot structure according to claim 1, wherein the second mounting section comprises at least one fixing hole formed therein.

4. The synchronized multiple-angle rotatable dual-pivot structure according to claim 1 further comprising a plurality of axles, wherein the first installation slot and the second installation slot each comprises a plurality of axle holes, the axles being set through opposite ends of each of the connection members and in coupling engagement with the axle holes so as to have the ends of each of the connection members rotatably and respectively coupled in the first installation slot and the second installation slot.

5. The synchronized multiple-angle rotatable dual-pivot structure according to claim 1, wherein the first pivot comprises an elastic plate and a washer fit thereto and the first pivot comprises a threaded section, a nut being screwed to the threaded section, so that the nut securely fix the support frame, the elastic plate, and the washer.

6. The synchronized multiple-angle rotatable dual-pivot structure according to claim 1, wherein the second pivot comprises an elastic plate and a washer fit thereto and the second pivot comprises a threaded section, a nut being screwed to the threaded section, so that the nut securely fix the support frame, the elastic plate, and the washer.

7. The synchronized multiple-angle rotatable dual-pivot structure according to claim 1, wherein the first pivot and the second pivot each comprise a planar face formed thereon.

8. The synchronized multiple-angle rotatable dual-pivot structure according to claim 1 further comprising a plurality of axles, the axles being mounted in the first installation slot and the second installation slot, the ends of each of connection members being respectively provided with two fitting openings, the fitting openings being each in the form of a notch to allow the fitting opening to fit over a corresponding one of the axles, whereby the two ends of each of the connection members are respectively and rotatably received in the first installation slot and the second installation slot.

9. The synchronized multiple-angle rotatable dual-pivot structure according to claim 1, wherein the connection members are arranged in a number of two in each of the first installation slot and the second installation slot.

\* \* \* \* \*